United States Patent
Jerdev

(10) Patent No.: US 8,120,696 B2
(45) Date of Patent: Feb. 21, 2012

(54) METHODS, APPARATUSES AND SYSTEMS USING WINDOWING TO ACCELERATE AUTOMATIC CAMERA FUNCTIONS

(75) Inventor: Dmitri Jerdev, South Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 639 days.

(21) Appl. No.: 11/513,263

(22) Filed: Aug. 31, 2006

(65) Prior Publication Data
US 2008/0055424 A1 Mar. 6, 2008

(51) Int. Cl.
G03B 13/00 (2006.01)
G03B 13/34 (2006.01)
G03B 9/22 (2006.01)
H04N 5/238 (2006.01)
H04N 9/73 (2006.01)

(52) U.S. Cl. ............ 348/349; 348/364; 348/223.1; 396/123; 396/92

(58) Field of Classification Search ........... 348/223.1, 348/345–357, 335, 229.1–238, 362–368; 396/123, 79, 93, 121, 122, 92
See application file for complete search history.

(56) References Cited

U.S. PATENT DOCUMENTS

| | | | | |
|---|---|---|---|---|
| 5,913,082 A * | 6/1999 | Onoda | ........................ | 396/128 |
| 6,876,384 B1 * | 4/2005 | Hubina et al. | ............. | 348/223.1 |
| 2002/0021897 A1 * | 2/2002 | Nakata | ........................ | 396/123 |
| 2003/0071908 A1 * | 4/2003 | Sannoh et al. | ................. | 348/345 |
| 2003/0076437 A1 * | 4/2003 | Karasaki et al. | .............. | 348/347 |
| 2004/0169767 A1 * | 9/2004 | Norita et al. | .................. | 348/350 |
| 2004/0201770 A1 * | 10/2004 | Sawachi | ........................ | 348/350 |
| 2006/0002698 A1 * | 1/2006 | Terayama | ..................... | 396/123 |
| 2006/0017835 A1 * | 1/2006 | Jacobsen | ....................... | 348/345 |

* cited by examiner

*Primary Examiner* — Sinh Tran
*Assistant Examiner* — Mark Monk
(74) *Attorney, Agent, or Firm* — Dickstein Shapiro LLP

(57) ABSTRACT

Methods, apparatuses and systems are disclosed for accelerating the operation of the automatic functions of an imager, e.g. a camera system. The automatic functions may, for example, include one or more of auto-focus, auto-exposure and auto-white balance. A special "windowing mode" is implemented in which information is acquired from only a subset of defined windows from the full pixel array area in order to set image capture parameters of the imager in accordance with current scene conditions.

29 Claims, 5 Drawing Sheets

METHODS, APPARATUSES AND SYSTEMS USING WINDOWING TO ACCELERATE AUTOMATIC CAMERA FUNCTIONS

FIELD OF THE INVENTION

Embodiments of the invention relate generally to imagers, and more particularly to methods, apparatuses and systems employing imagers for facilitating automatic camera functions.

BACKGROUND OF THE INVENTION

Solid state imagers, for example, CCD, CMOS and others, are widely used in imaging applications such as in digital still and video cameras. Many implementations of digital cameras include system-on-a-chip (SOC) imagers, which integrate a sensor core with image processing technology in one monolithic integrated circuit. The sensor core may include the pixel array, row and column logic, analog readout circuitry, and analog-to-digital conversion. The image processing technology may include circuitry for processing digitized sensor core signals using hardware, software or a combination of both.

One important aspect of digital cameras employing solid state imagers is that they be user friendly, particularly for amateur photographers. One method by which digital cameras accomplish this user-friendliness is by providing a wide range of automatic functions ("auto-functions"), such as, for example, auto-focus, auto-exposure and auto-white balance. Camera and/or imager parameters must be set in accordance with current scene conditions for proper operation of the automatic functions. These functions allow an amateur user to take a higher quality image than would be possible without these auto-functions, such as automatic focus, white balance, and exposure control. Some auto-functions, such as, for example, auto-focus may be controlled by the camera itself using inputs from the imager, whereas other auto-functions, such as, for example, auto-exposure and auto-white balance may be controlled by the imager within the camera.

In current cameras, it is challenging to accomplish these automatic tasks quickly. It takes a long time to set the camera and/or imager parameters when the solid state imager is unable to determine the value of important image characteristics (such as the average brightness of the scene) quickly. Often, for certain automatic functions, the solid state imager must take several sequential images of the scene using different settings while collecting statistics about the scene from these images prior to an actual capture of an image. Scene information is used in statistical analysis to set the camera and/or imager parameters for auto-functions. This usually requires the acquisition of several image frames until the camera and/or image parameters are adjusted to the desired values for an actual image capture. However, this procedure consumes significant amounts of time, especially for large image sizes.

One reason why the imager is unable to determine the necessary values for setting the camera and/or imager parameters in a single image frame is that the dynamic range of the imager pixels is not large enough. The dynamic range for a pixel is commonly defined as the ratio of its largest non-saturating signal to the standard deviation of its noise under dark conditions. The dynamic range is limited on an upper end by the charge saturation level of the pixel photosensor, and on a lower end by noise imposed limitations and/or quantization limits of an analog-to-digital converter used to produce a digital signal from analog pixel signals. The dynamic range of a scene is the contrast ratio between its brightest and darkest parts. An image with a dynamic range higher than that of the pixels in the imager cannot be captured in just a single exposure. Accordingly, several images must be acquired and analyzed with each new exposure setting as part of an auto-exposure process before a proper integration time is set for the imager. When the dynamic range of a pixel is too small to accommodate the variations in light intensities of the imaged scene e.g., by having a low saturation level, luminance clipping and image distortion occurs. For example, when a digital camera is exposed to bright light after working in dark conditions many of the pixels will be oversaturated and the output signal is clipped.

One way to solve this too small dynamic range problem would be to increase the dynamic range of the pixels. However, one downside to increasing the dynamic range of a pixel is that generally it requires a larger pixel. Larger pixel size may not be a feasible option for small size applications.

Another solution that has been proposed to speed up the process of setting camera and/or imager parameters in accordance with current scene conditions is that once image data information is collected for the entire image frame only a subset of the data is used in the statistical analysis portion of the parameter setting process. The drawback to this method, however, is that information on the entire frame must still be acquired, which still may take too much time, and is thus undesirable.

Accordingly, there is a desire and need for a method, apparatus and system for quickly setting camera and/or imager parameters in accordance with current scene conditions to facilitate the use of the auto-functions of a camera system.

DETAILED DESCRIPTION OF THE INVENTION

In the following detailed description, reference is made to the accompanying drawings which form a part hereof, and in which are shown, by way of illustration, embodiments of the invention. These embodiments are described in sufficient detail to enable those of ordinary skill in the art to make and use the embodiments, and it is to be understood that structural, logical or procedural changes may be made to the specific embodiments.

Embodiments of the invention relate to methods, apparatuses, and systems for accelerating the performance of the automatic functions of a camera containing an imager. The auto-functions include operations such as auto-focus, auto-exposure and auto-white balance. Embodiments of the invention use a special "windowing" mode in the operation of the imager in which the information from only a subset of the image frame, located in a set of predefined windows, rather than the information from the full image frame, is acquired and processed for statistical analysis. This windowing technique allows a solid state imager to collect pre-capture information about a scene much faster, which, in turn, accelerates the operation of the automatic functions for actual image capture. Camera and/or imager parameters are set in accordance with scene conditions in order to facilitate the auto-functions. The combination of camera and/or imager parameters may be referred to as image capture parameters.

Figure 1:
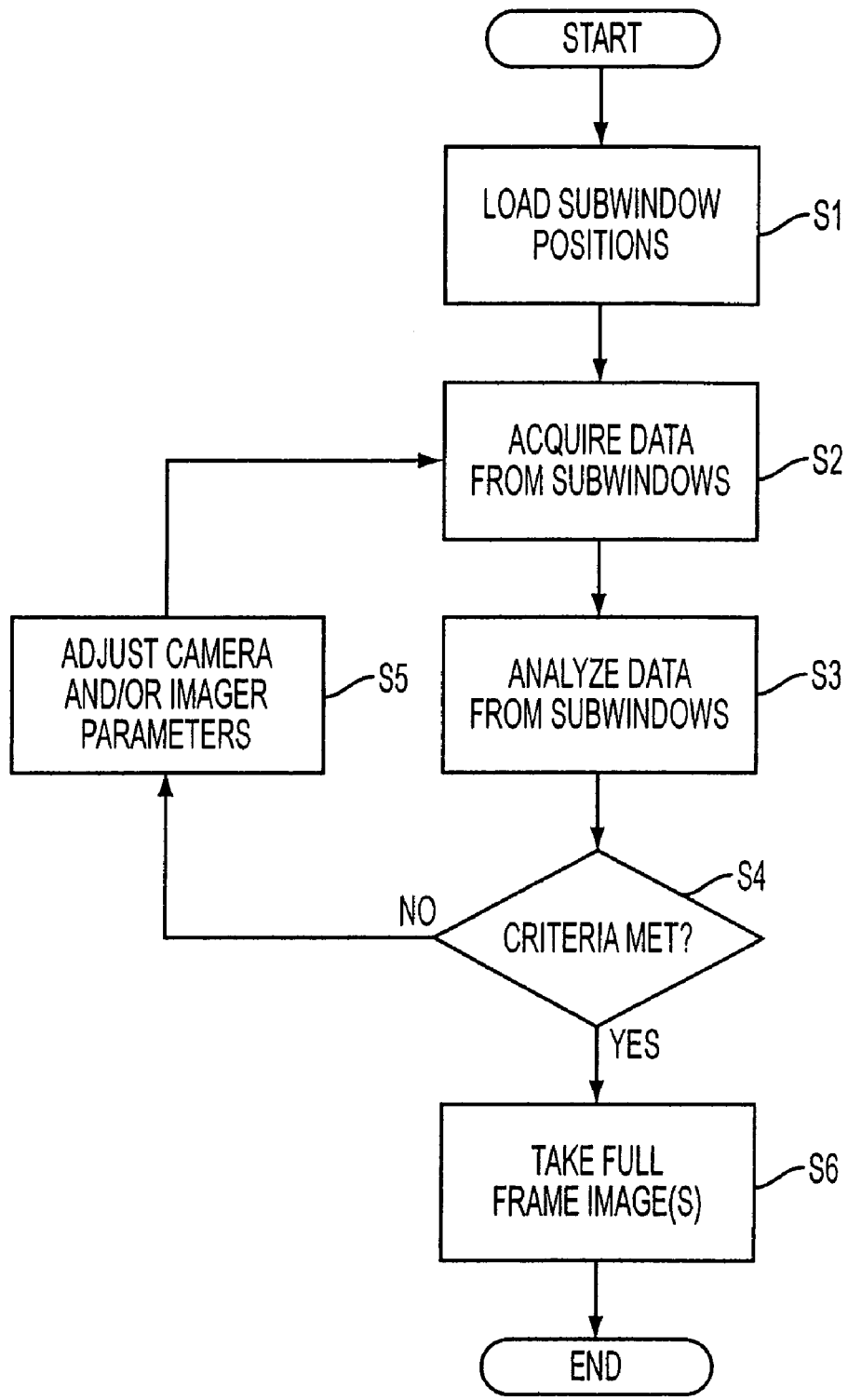
FIG. 1 is a flowchart illustrating processing steps in accordance with an embodiment disclosed herein.
Figure 2:
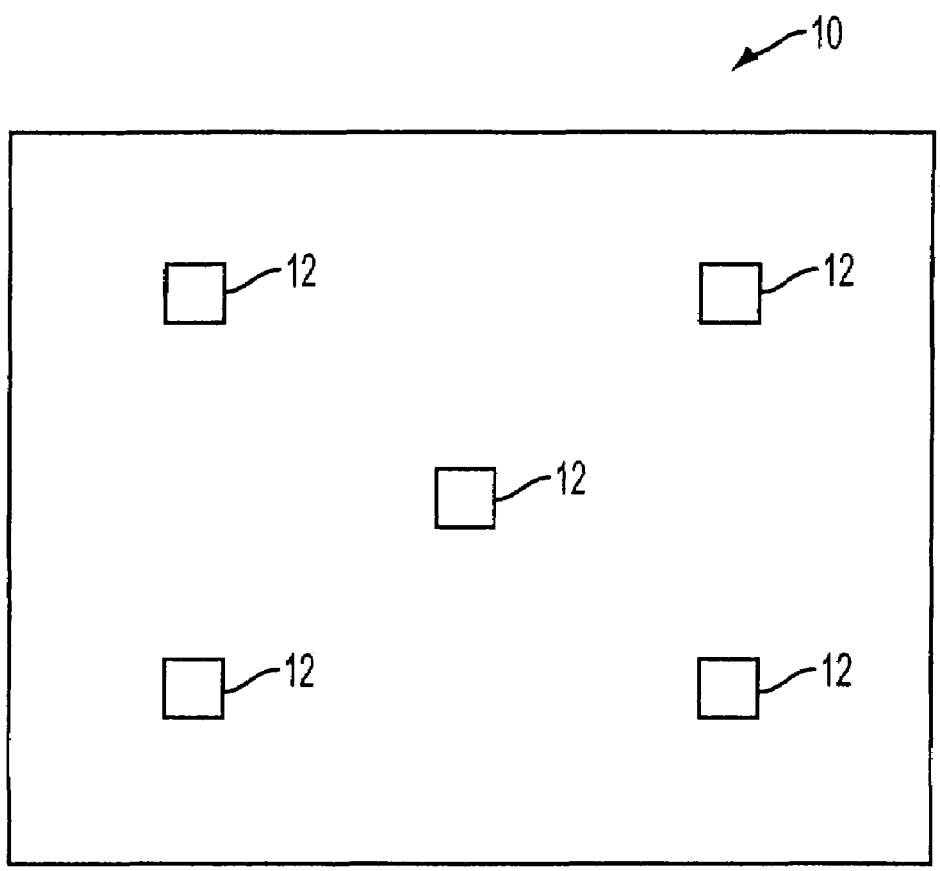
FIG. 2 depicts an image frame with subwindows for data collection for use in the process of setting camera and/or imager parameters in accordance with current scene conditions for use in automatic functions in accordance with an embodiment disclosed herein.

Referring to FIGS. 1 and 2, one embodiment is now described. FIGS. 1 and 2 show several subwindows 12 defined within the pixel array area 10. These subwindows 12 are loaded from the camera in step S1 and data is acquired from each of these subwindows 12 in step S2. This data may be read independently for each subwindow 12. The position, number and size of these subwindows 12 will depend on the specifics of the implementation. The subwindows 12 can be either predefined or specified through registers. They may also be user-defined (e.g., via user input to the registers). At step S2, the data collected is about the current scene conditions, such as brightness or focus information. This data is collected from a pixel array area 10 for only a subset of the array area, at the subwindows 12. Because only a small percentage of the total image data is collected, the time required to collect image scene data is greatly decreased.

Based on an analysis of the information collected about a particular scene from the subwindows 12, the imager may be required to adjust the size, location, number or shape of the subwindows 12, in order to accommodate the specifics of the scene. One reason the subwindows 12 may need to be adjusted is if the imager senses, for example, a very bright spot in the scene that is not currently within one of the subwindows 12. The imager can sense this condition when the bright section of the image affects the brightness of pixels at the edges of one or more of the subwindows 12. Although FIG. 2 shows five evenly sized subwindows 12 arranged evenly across the pixel image area 10, it should be understood that alternative numbers, sizes and arrangements of subwindows 12 may be utilized.

The total area of all of the subwindows 12 should be smaller than the size of the regular image frame in order to take advantage of the approach described herein. The smaller the total area of subwindows 12 relative to the entire pixel array, the faster the acquisition and processing of information used for the auto-functions.

Referring to FIG. 1, operation of an embodiment is described. In step S1, subwindow 12 positions are loaded from the camera. Data is acquired from these subwindows 12 at step S2. At step S3, this data is analyzed and operational information such as, for example, brightness or sharpness score, are extracted. Based on this analysis, the camera makes a decision, at step S4, if criteria are met for proper image taking. In the case of auto-exposure, for example, this would mean that the gains are optimally set. In the case of auto-focus, for example, this would mean that the lens position is optimally set. If the criteria are not met, the camera proceeds to step S5 where camera and/or imager parameters are adjusted. Adjustments are made to parameters such as imager gains and integration time or to the camera lens position. Steps S2 through S5 are repeated until the camera determines that the criteria for proper image taking are met (S4). Once the criteria are met, the camera proceeds to step S6, where one or several images (as determined by the user) are taken at the adjusted camera and/or imager settings. This process may also be repeated (by going from step S6 to step S1) if run in continuous mode, to allow continuous auto-features such as, for example, "continuous auto-focus."

In order to implement the embodiments of the invention, a special operational mode may be implemented in the sensor core 1101 (FIG. 3) of the imager 1100 to support collecting data from only the selected subwindows 12. This image data undergoes processing and statistical analysis. In this special mode, referred to herein as the "windowing mode," the time required to collect the image data information from the set of selected subwindows 12 of the image frame is much smaller than the time normally required for full-frame data acquisition. Therefore, in the same time required to acquire image data information about one image frame in the prior art, several sets of image data information may be collected from the subwindows 12 in the "windowing mode." Accordingly, setting the camera and/or imager parameters in accordance with the current scene conditions for each auto-function may be done much faster since several sets of "windows" of image data can be taken in the amount of time in which only one set of data information could be taken when the information is collected for the entire image frame.

The collecting and processing of the imager data gathered from the subwindows 12 may done transparently to the final user of a camera containing the imager 1100. The image data collected from the subwindows 12 is used for setting the camera and/or imager parameters in accordance with the current scene conditions. The collecting and processing of the imager data from the subwindows 12 may occur between image captures, for example, and will not affect the end user's use of the camera. In another embodiment, users may have the option of selecting the number and location of the subwindows 12 themselves, rather than relying on the camera's default or auto-select options; this is preferable for advanced users or professionals.

Figure 3:
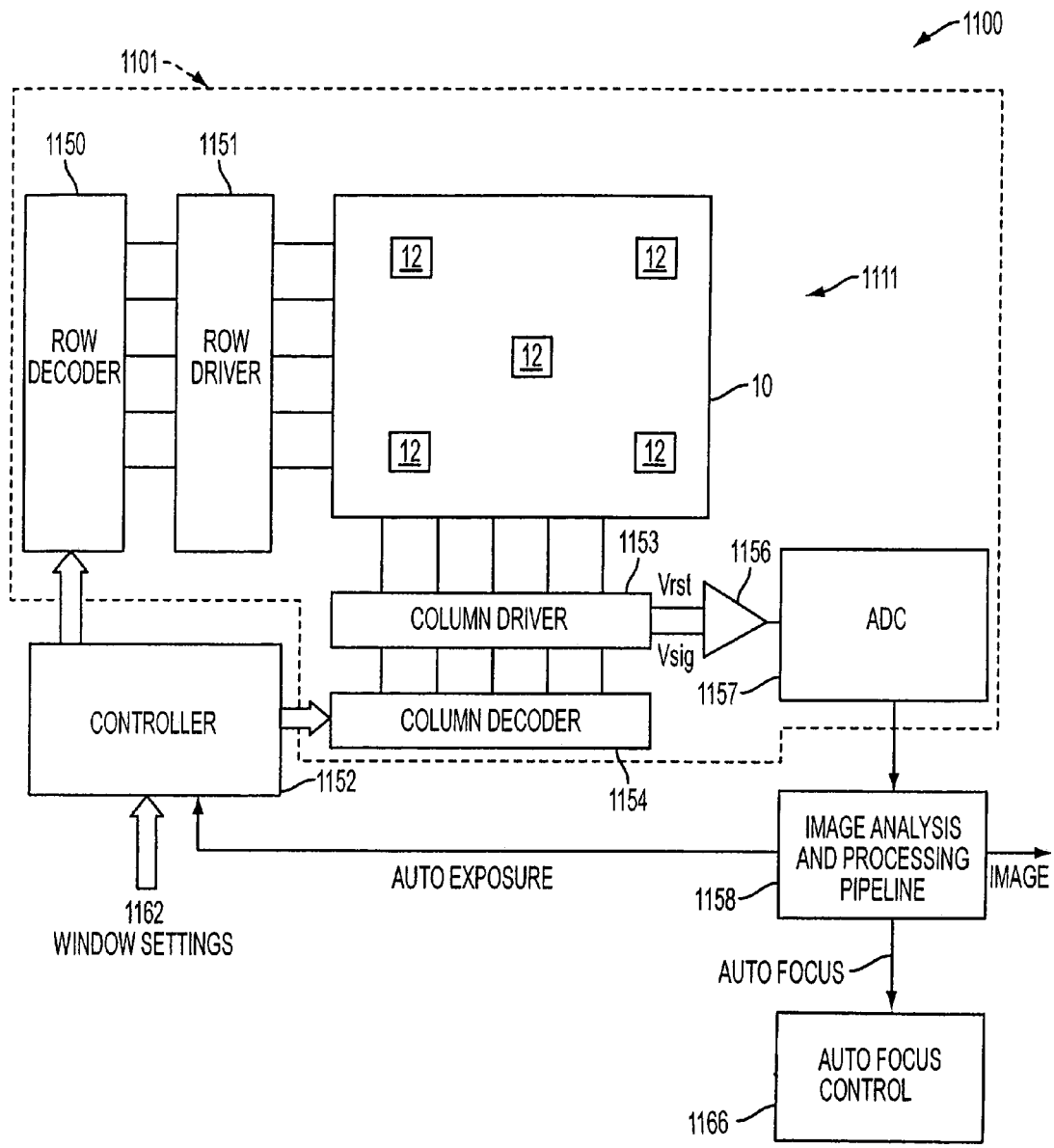
FIG. 3 depicts a CMOS imager according to an embodiment disclosed herein.

Referring again to FIG. 3, a single chip CMOS imager 1100 is illustrated, which has a pixel array 1111 containing a plurality of pixel cells arranged in rows and columns that make up the pixel image area 10 of FIG. 2 and which implements an embodiment of the invention, including the process described with reference to FIGS. 1 and 2. During the windowing mode, the pixel array 1111 is defined by one or more subwindows 12, as shown in FIGS. 2 and 3. The pixels of each row in array 1111, including those in each subwindow 12, are all turned on at the same time by a row select line, and the pixel signals of each column corresponding to a windowed area are selectively output onto column readout lines by respective column select lines. The row lines are selectively activated by a row driver 1151 in response to row address decoder 1150. The column select lines are selectively activated by a column driver 1153 in response to column address decoder 1154. The pixel array 1111 is operated by the timing and control circuit 1152, which controls address decoders 1150, 1154 for selecting the appropriate row and column lines for pixel signal readout. In an embodiment of the invention, the window settings 1162 are accessed by the control circuit 1152 to set the location, size, and number of the subwindows 12.

The signals on the column readout lines typically include a pixel reset signal ($V_{rst}$) and a pixel image signal ($V_{sig}$) for each pixel. Both signals are read into a sample and hold circuit (S/H) associated with the column driver 1153. A differential signal ($V_{rst}-V_{sig}$) is produced by a differential amplifier (AMP) 1156 for each pixel, and each pixel's differential signal is digitized by analog-to-digital converter (ADC) 1157. The pixel array 1111, row driver 1151, row address decoder 1150, column driver 1153, column address decoder 1154, amplifier 1156 and analog-to-digital converter 1157 make up the sensor core 1101.

As illustrated in FIG. 3, the analog-to-digital converter 1157 supplies the digitized pixel signals to an image analysis and processing pipeline 1158, which performs appropriate image processing before outputting digital signals defining an image. During the setting of the camera and/or imager parameters in accordance with the current scene conditions, the image analysis and processing pipeline 1158 sends feedback to the appropriate controller or processor for adjusting the camera and/or imager parameters related to exposure (exposure controller 1152 located within the imager 1100), white balance (image processor 1159 located within the image analysis and processing pipeline 1158) and focus (auto-focus controller 1166 located within the camera). These controllers 1152, 1158, 1159 may be implemented as separate respective controllers or may be implemented by one or more controllers. These parameters are set for an actual image capture in accordance with current scene conditions while the imager is operating in the "windowing mode."

Figure 4:
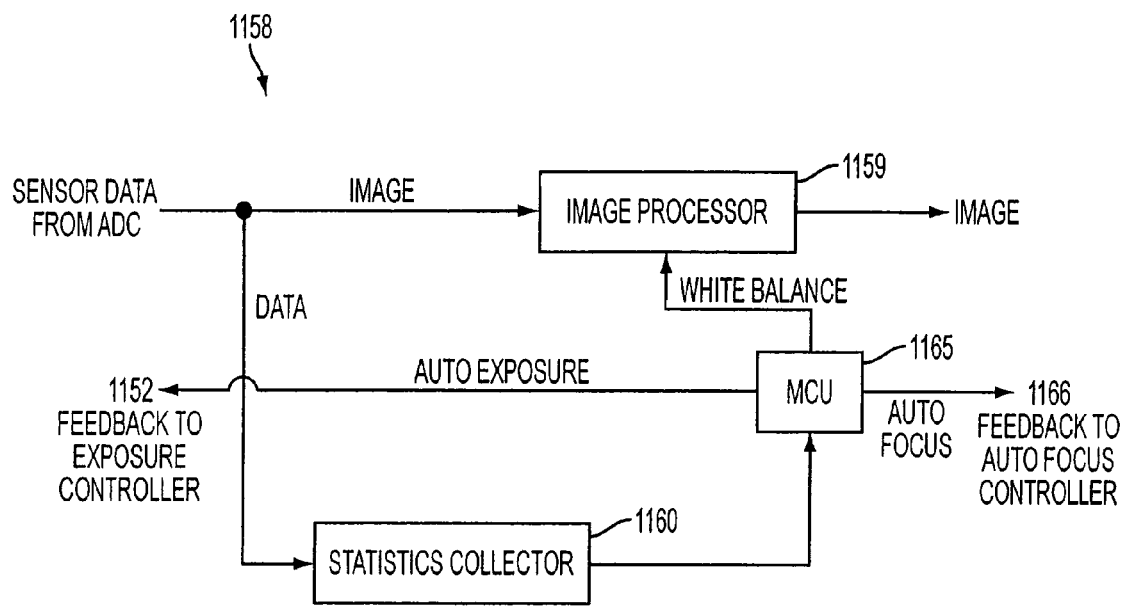
FIG. 4 depicts the image analysis pipeline of FIG. 3 in greater detail.

The image analysis and processing pipeline 1158 is shown in greater detail in FIG. 4 and further-includes an image processor 1159 for processing all pixel signals of pixel array 1111 to produce an output of a captured image, a statistics collector 1160 which collects statistical information for use in auto-function operations, and a microcontroller unit (MCU) 1165, as shown in FIG. 4. The image data information from the subwindows 12 obtained from the ADC 1157 is sent to the statistics collector 1160, which then sends the relevant statistics to the MCU 1165. The MCU 1165 determines what adjustments must be made to the camera and/or imager parameters in order to correct the focus, exposure and/or white balance. This feedback is sent back to the appropriate controllers or processors (1152, 1159, 1166) so that the required adjustments may be made. Generally, the focus is controlled electronically wherein the imager data is collected in the statistics collector 1160 and analyzed in the MCU 1165, which then causes the camera to adjust a lens focus accordingly. The exposure is adjusted by controlling integration time and gain at the pixel array 1111 level. The white balance is adjusted by image processing unit 1159.

Figure 5:
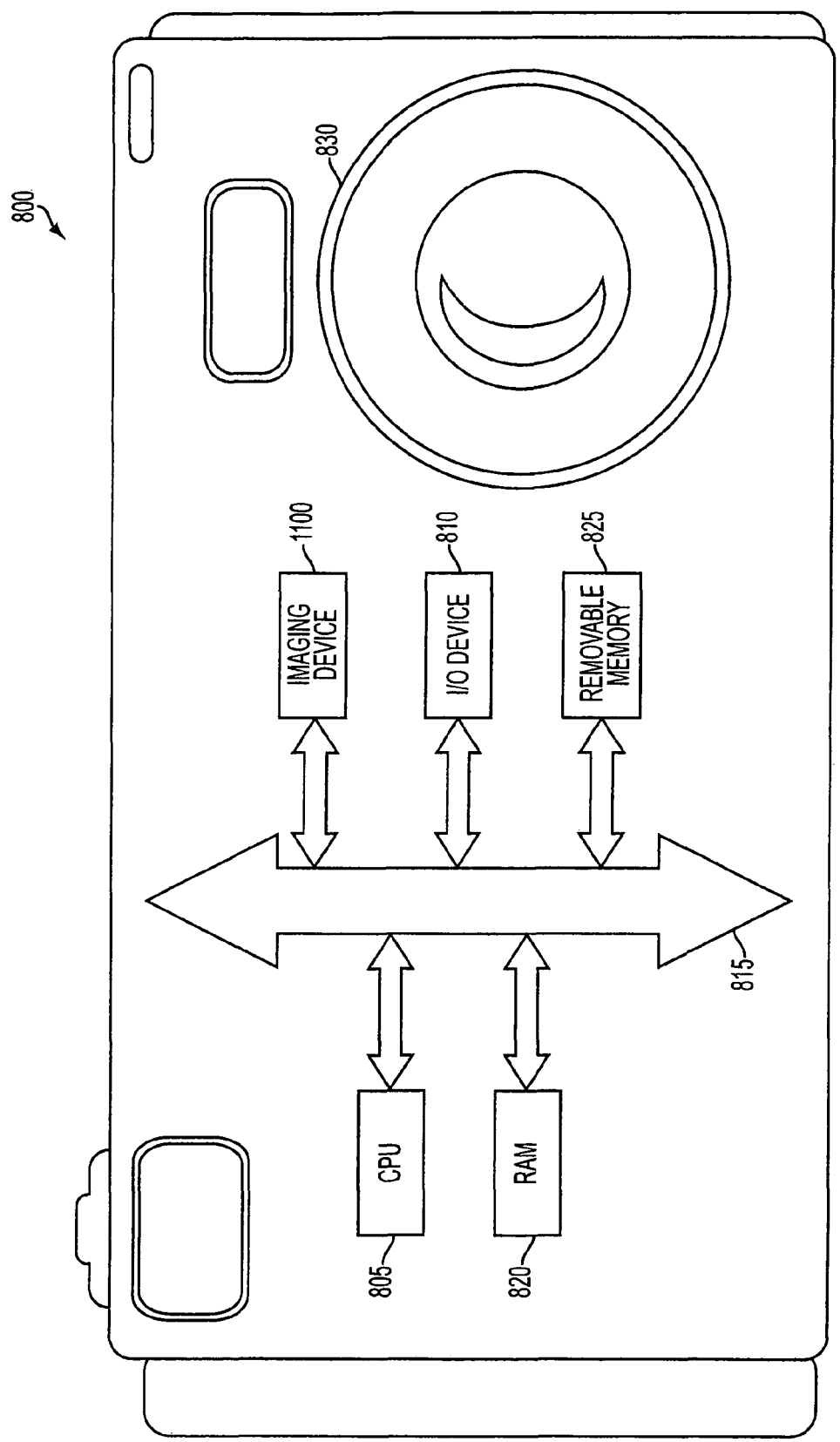
FIG. 5 depicts a processing system, for example a digital camera, which may employ an imager operating in accordance with an embodiment disclosed herein.

FIG. 5 is an embodiment of a camera system 800, for example, a digital still or video camera system employing a system-on-a-chip imager 1100 as illustrated in FIGS. 3 and 4. The camera and/or imager parameters are set in accordance with the current scene conditions within imaging device 1100 and within the camera 800 itself for operation of the automatic functions in accordance with embodiments of the invention. The camera system 800, generally includes a lens 830 for focusing an image on the pixel array 111 (FIG. 3) and a processor 805 (shown as a CPU) which implements system functions and controls image flow. The CPU processor 805 is coupled with other elements of the camera system 800, including random access memory 820, removable memory 825 such as a flash or disc memory, one or more input/output (I/O) devices 810 for entering data or displaying data and/or images and imaging device 1100 through bus 815, which may be one or more busses or bridges linking the processor system components.

The camera system 800 is an example of a system having digital circuits that could include imager devices. Without being limiting, such a system could include a computer system, camera system, scanner, machine vision, vehicle navigation, video phone, surveillance system, auto focus system, star tracker system, motion detection system, image stabilization system, and data compression system.

While embodiments of the invention have been described in detail as known at the time, it should be readily understood that the invention is not limited to the disclosed embodiments. Rather, the embodiments can be modified to incorporate any number of variations, alterations, substitutions or equivalent arrangements not heretofore described. For example, while the embodiments are described in connection with a CMOS imager, they can, as noted, be practiced with any other type of solid state imager (e.g., CCD, etc.) and with a still or video capture digital camera. Accordingly, the embodiments of the invention are not limited by the foregoing description or drawings.

What is claimed as new and desired to be protected by Letters Patent of the United States is:

1. A method of setting image capture parameters, comprising:
   prior to image capture, collecting image data information from a plurality of discrete areas of a pixel array at a first set of image capture parameters, wherein each of the plurality of discrete areas of the pixel array is smaller than the entire pixel array area and is apart and detached from others of the plurality of the discrete areas of the pixel array by areas of the pixel area that are not part of one of the plurality of discrete areas and wherein the image capture parameters define exposure, white balance and/or focus;
   based on the collected image data information, adjusting at least one of the size, location, number and shape of at least one of the plurality of discrete areas of the pixel array, resulting in an updated plurality of discrete areas of the pixel array, each of the updated plurality of discrete areas of the pixel array being apart and detached from others of the updated plurality of discrete areas of the pixel array;
   collecting image data information from the updated plurality of discrete areas of the pixel array at the first set of image capture parameters;
   determining adjustments of at least one image capture parameter based on the image data information collected from the updated plurality of discrete areas of the pixel array;
   adjusting the at least one image capture parameter based on the determination to an updated set of image capture parameters; and
   capturing an image using the updated set of image capture parameters.

2. The method of claim 1, wherein the steps of adjusting the plurality of discrete areas of the pixel array and collecting image data information from the updated plurality of discrete areas is repeated before determining adjustments of the at least one image capture parameter.

3. The method of claim 1, wherein the steps of collecting image data information from the updated plurality of discrete areas, determining required adjustments and adjusting the image capture parameters are repeated prior to the image capture.

4. The method of claim 1, wherein the plurality of discrete areas comprises a plurality of discrete subwindow areas.

5. The method of claim 1, wherein the updated image capture parameters control a camera automatic focus operation.

6. The method of claim 1, wherein the adjustments to the image capture parameters are determined based on a statistical analysis of the image data information collected from the updated plurality of discrete areas of the pixel array.

7. The method of claim 1, wherein adjusting the plurality of discrete areas comprises adjusting a size of at least one of the plurality of discrete areas.

8. A method of operating a digital camera comprising:
defining a plurality of discrete areas of a pixel array, wherein each of the plurality of discrete areas is a subset of the entire pixel array and is apart and detached from others of the plurality of discrete areas of the pixel array by areas of the pixel area that are not part of one of the plurality of discrete areas;
prior to image capture, acquiring image data information from the plurality of discrete areas of the pixel array at a first set of image capture parameters wherein the image capture parameters define exposure white balance and/or focus;
processing the image data information collected from the plurality of discrete areas of the pixel array to obtain scene statistics;
analyzing the acquired image data information;
according to the analysis of the acquired image data information, adjusting at least one of the size, location, number and shape of at least one of the plurality of discrete areas of the pixel array, resulting in an adjusted plurality of discrete areas, each of the adjusted plurality of discrete areas being apart and detached from others of the updated plurality of discrete areas;
acquiring updated image data information from the adjusted plurality of discrete areas of the pixel array at the first set of image capture parameters;
processing the updated image data information to obtain updated scene statistics;
adjusting an automatic function image capture parameter to an updated set of image capture parameters in accordance with the updated image data information and the updated scene statistics; and
acquiring an image under the updated set of image capture parameters.

9. The method of claim 8, wherein the steps of analyzing the acquired image data information, adjusting the plurality of discrete areas of the pixel array and acquiring updated image data information from the adjusted plurality of discrete areas of the pixel array are repeated until a determination is made that the plurality of discrete areas of the pixel array do not require further adjustment.

10. The method of claim 9, wherein adjusting the plurality of discrete areas of the pixel array comprises adjusting a size of at least one of the plurality of discrete areas of the pixel array.

11. The method of claim 8, further comprising determining if there is an adequate amount of image data information to adjust the automatic function image capture parameter in accordance with current scene conditions and, if not, adjusting image sensor and camera settings in response to the scene statistics and acquiring updated image data information from the adjusted plurality of discrete areas of the pixel array.

12. The method of claim 11, wherein the steps of determining if there is an adequate amount of image data information to adjust the at least one automatic function image capture parameter in accordance with current scene conditions, adjusting the image sensor and camera settings in response to the scene statistics, and acquiring updated image data information from the adjusted plurality of discrete areas of the pixel array are repeated until a determination is made that the adequate amount of image data information has been acquired to adjust the automatic function image capture parameter in accordance with current scene conditions.

13. The method of claim 8, wherein the automatic function image capture parameter controls at least one of a camera automatic focus operation, an automatic exposure control operation and an automatic white balance operation.

14. An imager comprising:
an array of pixels for receiving an image;
a control circuit for reading image data information signals from a subset of pixels of the array, wherein the subset of pixels comprises a plurality of discrete areas of the array, where each of the plurality of discrete areas of the pixel array is apart and detached from others of the plurality of discrete areas of the pixel array by areas of the pixel area that are not part of one of the plurality of discrete areas; and
a processing circuit for processing image data information signals collected at a first set of image capture parameters from the subset of pixels of the array the image capture parameters defining exposure, white balance and/or focus, the processing circuit providing instructions to the control circuit to adjust, based on the image data information contained in the image data information signals, specifications of at least one of the size, location, number and shape of at least one of the plurality of discrete areas comprising the subset of pixels of the array, resulting in an adjusted subset of pixels of the array comprising an adjusted plurality of discrete areas, each of the adjusted plurality of discrete areas being apart and detached from others of the updated plurality of discrete areas, and to read updated image data information signals from the adjusted subset of pixels of the array at the first set of image capture parameters, and determining an updated set of image capture parameters in accordance with current scene conditions from the image data information contained in the updated image data information signals.

15. The imager of claim 14, wherein the processing circuit further comprises:
a statistics collector configured to analyze the information contained in the image data information signals; and
a circuit responsive to the statistics collector and configured to set the updated set of image capture parameters in accordance with current scene conditions.

16. The imager of claim 14, wherein the processing circuit provides instructions for setting the updated set of image capture parameters in accordance with current scene conditions to operate at least one automatic function.

17. The imager of claim 16, wherein the at least one automatic function comprises at least one of a camera automatic focus operation, an automatic exposure control operation and an automatic white balance operation.

18. A digital camera comprising:
an array of pixels for receiving an image;
a lens for focusing an image in said array of pixels;
a control circuit for reading image data information signals from a subset of pixels of the array, wherein the subset of pixels comprises a plurality of discrete areas of the array and each of the plurality of discrete areas of the pixel array is apart and detached from others of the plurality of discrete areas of the pixel array by areas of the pixel area that are not part of one of the plurality of discrete areas; and
a processing circuit for processing image data information signals produced by the subset of the array of pixels at a first set of image capture parameters the image capture parameters defining exposure, white balance and/or focus, the processing circuit providing instructions to the control circuit to adjust, based on the image data information contained in the image data information signals, specifications of at least one of the size, location, number and shape of at least one of the plurality of discrete areas comprising the subset of pixels of the array, resulting in an adjusted subset of pixels of the array comprising an adjusted plurality of discrete areas, each of the adjusted plurality of discrete areas being apart and detached from others of the updated plurality of discrete areas, and to read updated image data information signals from the adjusted subset of pixels of the array at the first set of image capture parameters, and providing values for an updated set of image capture parameters in accordance with current scene conditions for operation of at least one automatic function of the digital camera from information contained in the updated image data information signals.

19. The digital camera of claim 18, wherein the at least one automatic function comprises at least one of an automatic focus operation, an automatic exposure control operation and an automatic white balance operation.

20. A digital camera comprising:
an image pixel array area;
a lens for focusing an image in said image pixel array area;
a system for defining a plurality of discrete subset areas of the image pixel array area;
an image sensor controller for controlling collection of image data information from the plurality of discrete subset areas of the image pixel array area, wherein each of the plurality of discrete subset areas of the image pixel array area is apart and detached from others of the plurality of discrete subset areas of the image pixel array area by areas of the image pixel array area that are not part of one of the plurality of discrete subset areas;
a system for adjusting, based on collected image data information collected at a first set of image capture parameters the image capture parameters defining exposure, white balance and/or focus, specifications of at least one of the size, location, number and shape of at least one of the plurality of discrete subset areas of the image pixel array area, resulting in an updated plurality of discrete subset areas of the pixel array, each of the updated plurality of discrete subset areas of the pixel array being apart and detached from others of the updated plurality of discrete subset areas of the pixel array, and causing the image sensor controller to collect updated image data information from the updated plurality of discrete subset areas of the image pixel array area at the first set of image capture parameters; and
an image analysis and processing pipeline for receiving and processing the updated image data information collected from the updated plurality of discrete subset areas of the image pixel array area, wherein the image analysis and processing pipeline further comprises:
a statistic collector for collecting image data information from the updated plurality of discrete subset areas of the image pixel array area; and
a system for receiving relevant image data information sent from the statistics collector and for determining values for an updated set of image capture parameters in accordance with current scene conditions.

21. The digital camera of claim 20, further comprising:
a focus controller; and
an image processor located within the image analysis and processing pipeline,
wherein the circuit for receiving relevant image data information is operable to provide required adjustments to image capture parameters related to focus, exposure and white balance and to send these required adjustments to the focus controller, the image sensor controller and the image processor, respectively.

22. The digital camera of claim 20, further comprising at least one of:
a white balance controller for adjusting white balance, wherein the white balance controller is operable to receive values of the updated set of image capture parameters in accordance with current scene conditions from the circuit for receiving relevant image data information, and adjust the white balance of a captured image according to the values of the updated set of image capture parameters;
a focus controller for adjusting focus wherein the focus controller is operable to receive values of the updated set of image capture parameters in accordance with current scene conditions from the circuit for receiving relevant image data information, and adjust the focus of a captured image according to the values of the updated set of image capture parameters; and
an exposure controller for adjusting exposure wherein the exposure controller is operable to receive values of the updated set of image capture parameters in accordance with current scene conditions from the circuit for receiving relevant image data information, and adjust the exposure of a captured image according to the values of the updated set of image capture parameters.

23. The method of claim 1, wherein adjusting the plurality of discrete areas comprises adjusting a location of at least one of the plurality of discrete areas.

24. The method of claim 1, wherein adjusting the plurality of discrete areas comprises adjusting a shape of at least one of the plurality of discrete areas.

25. The method of claim 1, wherein the updated set of image capture parameters controls an automatic exposure correction operation.

26. The method of claim 1, wherein the updated set of image capture parameters controls an automatic white balance operation.

27. The method of claim 9, wherein adjusting the plurality of discrete areas of the pixel array comprises adjusting a location of at least one of the plurality of discrete areas of the pixel array.

28. The method of claim 9, wherein adjusting the plurality of discrete areas of the pixel array comprises adjusting a number of the plurality of discrete areas of the pixel array.

29. The method of claim 9, wherein adjusting the plurality of discrete areas of the pixel array comprises adjusting a shape of at least one of the plurality of discrete areas of the pixel array.

* * * * *

UNITED STATES PATENT AND TRADEMARK OFFICE
CERTIFICATE OF CORRECTION

| | | |
|---|---|---|
| PATENT NO. | : 8,120,696 B2 | |
| APPLICATION NO. | : 11/513263 | |
| DATED | : February 21, 2012 | |
| INVENTOR(S) | : Dmitri Jerdev | |

It is certified that error appears in the above-identified patent and that said Letters Patent is hereby corrected as shown below:

In column 7, line 11, in Claim 8, delete "exposure" and insert -- exposure, --, therefor.

Signed and Sealed this
Seventeenth Day of April, 2012

David J. Kappos
*Director of the United States Patent and Trademark Office*